(12) United States Patent
Pricer

(10) Patent No.: US 7,725,423 B1
(45) Date of Patent: May 25, 2010

(54) ANALYZING ASSOCIATIONS IN THE ORDER OF TRANSACTIONS

(75) Inventor: James E. Pricer, San Diego, CA (US)

(73) Assignee: Teradata US, Inc., Miamisburg, OH (US)

(*) Notice: Subject to any disclaimer, the term of this patent is extended or adjusted under 35 U.S.C. 154(b) by 167 days.

(21) Appl. No.: 09/779,866

(22) Filed: Feb. 8, 2001

(51) Int. Cl.
G06F 17/30 (2006.01)

(52) U.S. Cl. .................................. 707/7; 707/3; 707/10

(58) Field of Classification Search ..................... 707/1, 707/7, 10, 102, 104.1; 705/10, 7, 14
See application file for complete search history.

(56) References Cited

U.S. PATENT DOCUMENTS

| | | | | |
|---|---|---|---|---|
| 4,578,530 A | * | 3/1986 | Zeidler | 705/79 |
| 5,241,648 A | * | 8/1993 | Cheng et al. | 707/7 |
| 5,615,341 A | * | 3/1997 | Agrawal et al. | 705/10 |
| 5,729,733 A | * | 3/1998 | Sharif-Askary | 707/8 |
| 5,806,074 A | * | 9/1998 | Souder et al. | 707/201 |
| 5,878,419 A | * | 3/1999 | Carter | 707/10 |
| 5,924,094 A | * | 7/1999 | Sutter | 707/10 |
| 5,974,396 A | * | 10/1999 | Anderson et al. | 705/10 |
| 6,014,647 A | * | 1/2000 | Nizzari et al. | 707/1 |
| 6,052,672 A | * | 4/2000 | Foster | 705/35 |
| 6,061,682 A | * | 5/2000 | Agrawal et al. | 707/6 |
| 6,226,634 B1 | * | 5/2001 | Ogihara et al. | 707/4 |
| 6,230,166 B1 | * | 5/2001 | Velamuri et al. | 707/206 |
| 6,236,982 B1 | * | 5/2001 | Mahajan et al. | 706/45 |
| 6,278,998 B1 | * | 8/2001 | Ozden et al. | 707/6 |
| 6,308,168 B1 | * | 10/2001 | Dovich et al. | 707/1 |
| 6,408,295 B1 | * | 6/2002 | Aggarwal et al. | 707/6 |
| 6,430,539 B1 | * | 8/2002 | Lazarus et al. | 705/10 |
| 6,553,366 B1 | * | 4/2003 | Miller et al. | 707/2 |
| 6,578,026 B1 | * | 6/2003 | Cranston et al. | 707/2 |
| 6,611,829 B1 | * | 8/2003 | Tate et al. | 707/2 |
| 2002/0016771 A1 | * | 2/2002 | Carothers et al. | 705/1 |
| 2002/0103660 A1 | * | 8/2002 | Cramon et al. | 705/1 |

OTHER PUBLICATIONS

WO00/20998 A1 by Miller et al, G06F 17/30, 3/14, Filed Oct. 10, 1999 Published Apr. 13, 2000.*

* cited by examiner

*Primary Examiner*—Baoquoc N To
(74) *Attorney, Agent, or Firm*—Howard Speight

(57) ABSTRACT

A method, computer program and database system for use in analyzing associations in the order of transactions are disclosed. Data is loaded from the transactions into the database system. The data includes an entry for each transaction and the transactions are grouped into groups. The transactions within each group are put into an order. An analysis of the groups of transactions is performed to find associations in the order of the transactions in the groups.

12 Claims, 12 Drawing Sheets

ANALYZING ASSOCIATIONS IN THE ORDER OF TRANSACTIONS

BACKGROUND

In recent years, businesses have found it more and more useful to analyze the transactions they undertake with their customers. In some cases, such an analysis can provide the business with the information it needs to fine tune the transactions to shape customer behavior to improve performance of the business.

For example, an electronic commerce company may want to analyze the "clickstream" of individual customers visiting the company's web page to find associations between customer actions, such as the customer clicking on a particular image on the web page, and desired customer actions, such as the customer making a purchase. With this information, the company may tune its web page to increase the likelihood that a customer will click on the image, with the hoped-for result that sales will increase. A method and apparatus for performing this analysis, called "association" or "affinity analysis," using a massively parallel processing (MPP) computer system is described in co-pending U.S. patent application Ser. No. 09/410,528, entitled SQL-BASED ANALYTIC ALGORITHM FOR ASSOCIATION, filed on Oct. 1, 1999, and assigned to the same assignee as the present application.

This analytical approach can be useful in analyzing other forms of data, such as retail or financial data. The owners of a grocery store, for example, may find it useful in designing the layout of the store to know that customers are more likely to purchase cheese when they purchase grapes. Similarly, a bank may find it useful to know that customers who contract for certain banking services, such as a checking account, are more likely to acquire other banking services, such as automobile loans. The bank could use such information to design the mailing materials it includes with its statements.

It is sometimes important to isolate the actions of individual customers to properly perform affinity analysis. For example, in the web page context, in which a log is maintained containing customer transactions with the web page, it may be useful to associate transactions with individual customer "sessions" in order to allow a meaningful analysis of the transactions. A method and apparatus for performing such an analysis is described in co-pending U.S. patent application Ser. No. 09/752,355, entitled IDENTIFYING WEB-LOG DATA REPRESENTING A SINGLE USER SESSION, filed on Dec. 29, 2000, and assigned to the same assignee as the present application.

Understanding the order of transactions may also be important. For example, a web page owner may be interested to know that a customer that clicks on a first image on the web page followed by a second image may be more likely to make a purchase than a customer that clicks on the second image before the first image. Making such a determination adds an extra degree of complexity to an affinity analysis.

SUMMARY

In general, in one aspect, the invention features a method for use in analyzing associations in the order of transactions. The method includes loading data from the transactions into a database system. The data includes an entry for each transaction and the transactions are grouped into groups. The method includes ordering the transactions within each group and performing an analysis of the groups of transactions to find associations in the order of the transactions in the groups.

Implementations of the invention may include one or more of the following. The data for each transaction may include a time stamp related to a time that the transaction occurred. Ordering the transactions may include numbering the transactions based on the time stamps included in the data for the transactions. Numbering the transactions may include numbering the transactions in order from the transaction having the earliest time stamp to the transaction having the latest time stamp.

Loading the data from the transactions into the database system may include parsing the data for each transaction into fields in the database system and identifying one of the fields as a group identifier field where a group identifier for each transaction is stored. Loading the data from the transactions into the database system may further include identifying one of the fields as an item identifier field where an item identifier for each transaction is stored. Performing the analysis may include performing an affinity analysis. Ordering the transactions in each group of transactions may include concatenating an order number to the item identifier for each transaction.

Performing the analysis may include building one or more support tables for one or more item identifiers with concatenated order number and calculating support, confidence and lift by joining the support tables. Building the one or more support tables may include counting the transactions containing various combinations of item identifiers with concatenated order number and dividing the count by a total number of groups to obtain a support for each of the combinations. Building the one or more support tables may include for each item identifier with concatenated order number, counting the transactions containing the same item identifier with concatenated order number and computing the support by dividing the count by a total number of groups and storing the item identifier with concatenated order number and the support in a first support table. Building the one or more support tables may include building a second base table by selecting transactions from the first base table that include an item identifier corresponding to an item identifier and concatenated order number having a support more than a predetermined value. Building the one or more support tables may include counting the transactions in the second base table containing various combinations of item identifiers with concatenated order number and dividing the count by a total number of groups in the second base table to obtain a support for each of the combinations. Building the one or more support tables may further include counting the transactions in the second base table containing combinations of two specified item identifiers with concatenated order number and dividing the count by a total number of transactions in the second base table to obtain a support for each of the combinations and storing the item identifiers and computed support in a two item support table. Building the one or more support tables may include counting the transactions in the second base table containing combinations of N specified item identifiers with concatenated order number and dividing the count by a total number of transactions in the second base table to obtain a support for each of the combinations and storing the item identifiers and computed support in an N item support table.

In general, in another aspect, the invention features a method for use in analyzing associations in the order of transactions. The method includes loading data from the transactions into a database system, where the data includes an entry for each transaction and where loading the data includes grouping the transactions into groups. The method includes selecting sessions of transactions belonging to the same group and corresponding to a single session, ordering the transactions within each session, and performing an analysis of the sessions of transactions to find associations in the order of the transactions in the sessions.

Implementations of the invention may include one or more of the following. Each entry may include a time stamp related to a time that the transaction occurred. Selecting may include selecting entries with time stamps lying in a predetermined range. Ordering may include numbering the selected entries based on their respective time stamps. Numbering may include numbering the selected entries from the earliest to the latest, numbering the selected entries from the latest to the earliest, or numbering the selected entries based on their respective distance in time from a reference time.

In general, in another aspect, the invention features a computer program, stored on a tangible storage medium, for use in analyzing associations in the order of electronically stored transactions. The program includes executable instructions that cause a computer to load data from the transactions into a database system. The data includes an entry for each transaction and the transactions are grouped into groups. The computer program further includes executable instructions that cause the computer to order the transactions within each group and perform an analysis of the groups of transactions to find associations in the order of the transactions in the groups.

Implementations of the invention may include one or more of the following. The program further may include executable instructions that cause a computer to select sessions of transactions belonging to the same group and corresponding to a single session. Each entry may include a time stamp related to a time that the transaction occurred. When selecting sessions, the computer may selects entries with time stamps lying in a predetermined range. When loading data from the transactions, the computer may parse the transaction data into fields in a base table in the database system, identify one of the fields as a group identifier field where a group identifier for each transaction is stored, and identify one of the fields as an item identifier field where an item identifier for each transaction is stored. In ordering the transactions in each group of transactions, the computer may concatenate an order number to the item identifier for each transaction. In performing the analysis, the computer may build one or more support tables for one or more item identifiers with concatenated order number and calculate support, confidence and lift by joining the support tables.

In general, in another aspect, the invention features a database system for use in analyzing associations in the order of transactions. The database system includes a massively parallel processing system, which includes one or more nodes and a plurality of CPUs. Each of the one or more nodes provides access to one or more CPUs. The database system further includes a plurality of virtual processes. Each of the one or more CPUs provides access to one or more virtual processes. Each virtual process is configured to manage data stored in one of a plurality of data-storage facilities. The database system further includes a parsing engine configured to parse transaction data and store the parsed transaction data in a table that is distributed across two or more data-storage facilities. The data includes an entry for each transaction and the transactions are grouped into groups. The database system includes a database-management component configured to operate on the table to order the transactions within each group, and perform an analysis of the groups of transactions to find associations in the order of the transactions in the groups.

Implementations of the invention may include one or more of the following. The database-management component may be configured to select sessions of transactions belonging to the same group and corresponding to a single session. Each entry may include a time stamp related to a time that the transaction occurred. When selecting sessions, the database management system may select entries with time stamps lying in a predetermined range. When loading data from the transactions, the database management system may parse the transaction data into fields in a base table in the database system, identify one of the fields as a group identifier field where a group identifier for each transaction is stored, identify one of the fields as an item identifier field where an item identifier for each transaction is stored, and order the transactions in each group of transactions, which may include concatenating an order number to the item identifier for each transaction. When performing the analysis, the database management system may build one or more support tables for one or more item identifiers with concatenated order number and calculate support, confidence and lift by joining the support tables.

Other features and advantages will become apparent from the description and claims that follow.

DETAILED DESCRIPTION

Figure 1:
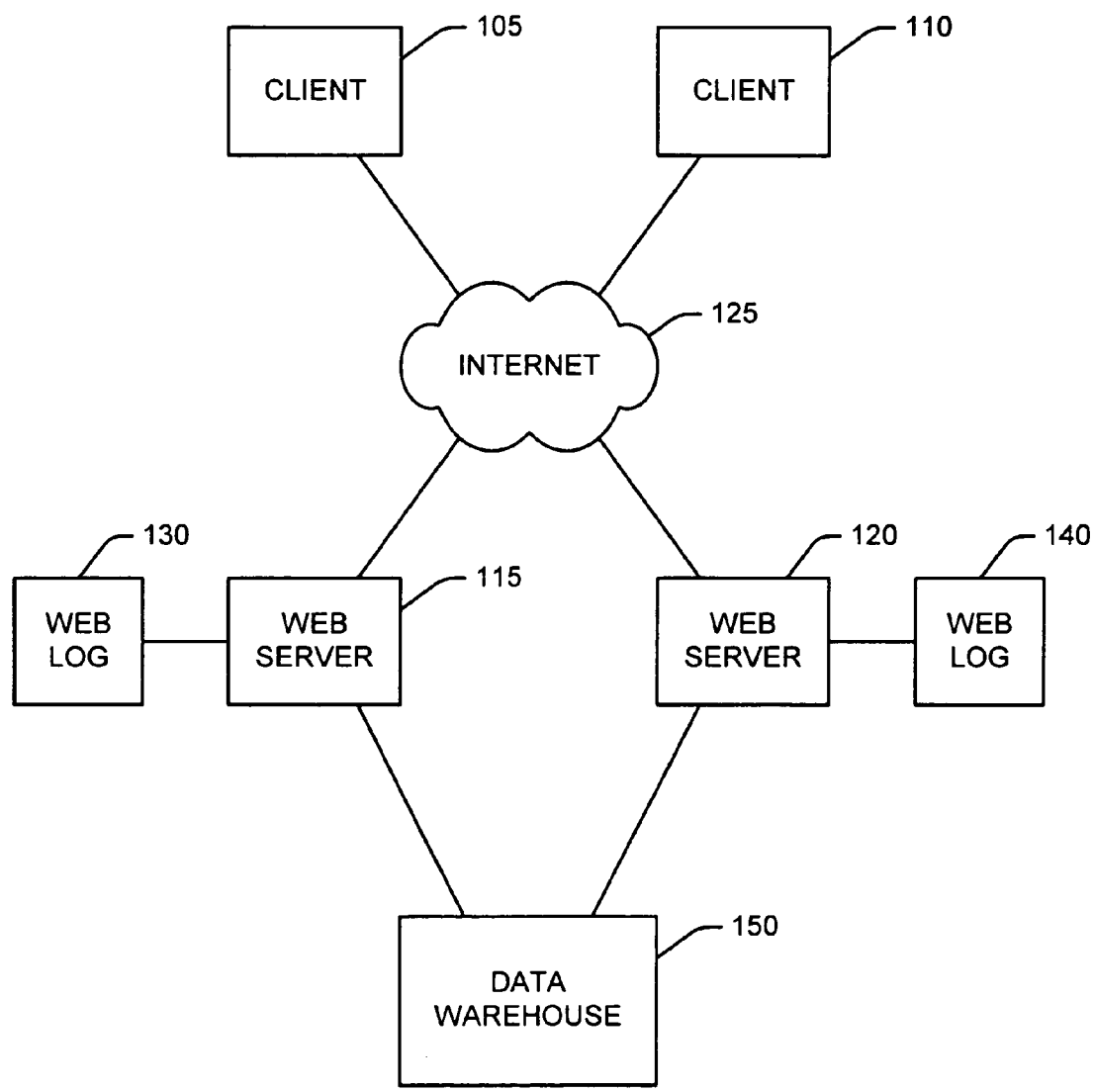
FIGS. 1 through 4 are block diagrams of systems for use in capturing and analyzing transactional data.

FIG. 1 shows a system for use in capturing and analyzing the data stored in the Web log of a typical Internet server. In general, one or more customers of an Internet-based business, using one or more client computing systems 105, 110, visit the business' Web servers 115, 120 through the Internet 125. The Web servers 115, 120 catalog every piece of information requested by the client systems 105, 110 in Web logs 130, 140 Table I below shows the types of entries found in a typical Web log.

[04/03/00  15:58:38:4  user1@ip.address.1  {81ce9636} Thread-56|954808107387] system:
  Executing TestMain
[04/03/00  15:58:38:7  user2@ip.address.2  {8b9a63ad} Thread-46|954808118796] system:
  Executing OLAMasterPage2
[04/03/00  15:58:38:8  user2@ip.address.2  {8b9a63ad} Thread-46|954808118796] system:
  Executing OLAMasterPage2
[04/03/00  15:58:40:3  user3@ip.address.3  {004a6ebe} Thread-46|954808120281] system:
  Executing Test2Main
[04/03/00  15:59:00:3  user4@ip.address.4  {05c13d8e} Thread-40|954808140357] system:
  Executing Test3
[04/03/00  15:59:06:5  user5@ip.address.5  {d9e81c18} Thread-28|954808146289] system:
  Executing Test3
[04/03/00  15:59:09:9  user6@ip.address.6  {4a29b2ea} Thread-15|954808149945] system:
  Executing Test3
[04/03/00  15:59:56:9  user7@ip.address.7  {ad23a2fd} Thread-32|954808166955] system:
  Executing Home Table 1

Web-log entries usually include several pieces of information, such as a date-and-time stamp for each request submitted to the Web server, a code identifying the user or client system making the request, and the name of the action or information requested. In the example shown here, the first Web log entry includes the date-and-time stamp "04/03/00

15:58:38:4," the user-ID code "user@ip.address.1," and the action code "system: Execute TestMain."

The Web servers 115, 120 maintained by the business both connect to a database management system (DBMS) 150$_1$ such as a Teradata Active Data Warehousing System available from NCR Corporation. The DBMS 150 gathers data from the Web logs 130, 140 maintained by the Web servers 115, 120 and uses this data to reconstruct the clickstreams associated with individual user sessions.

Figure 2:
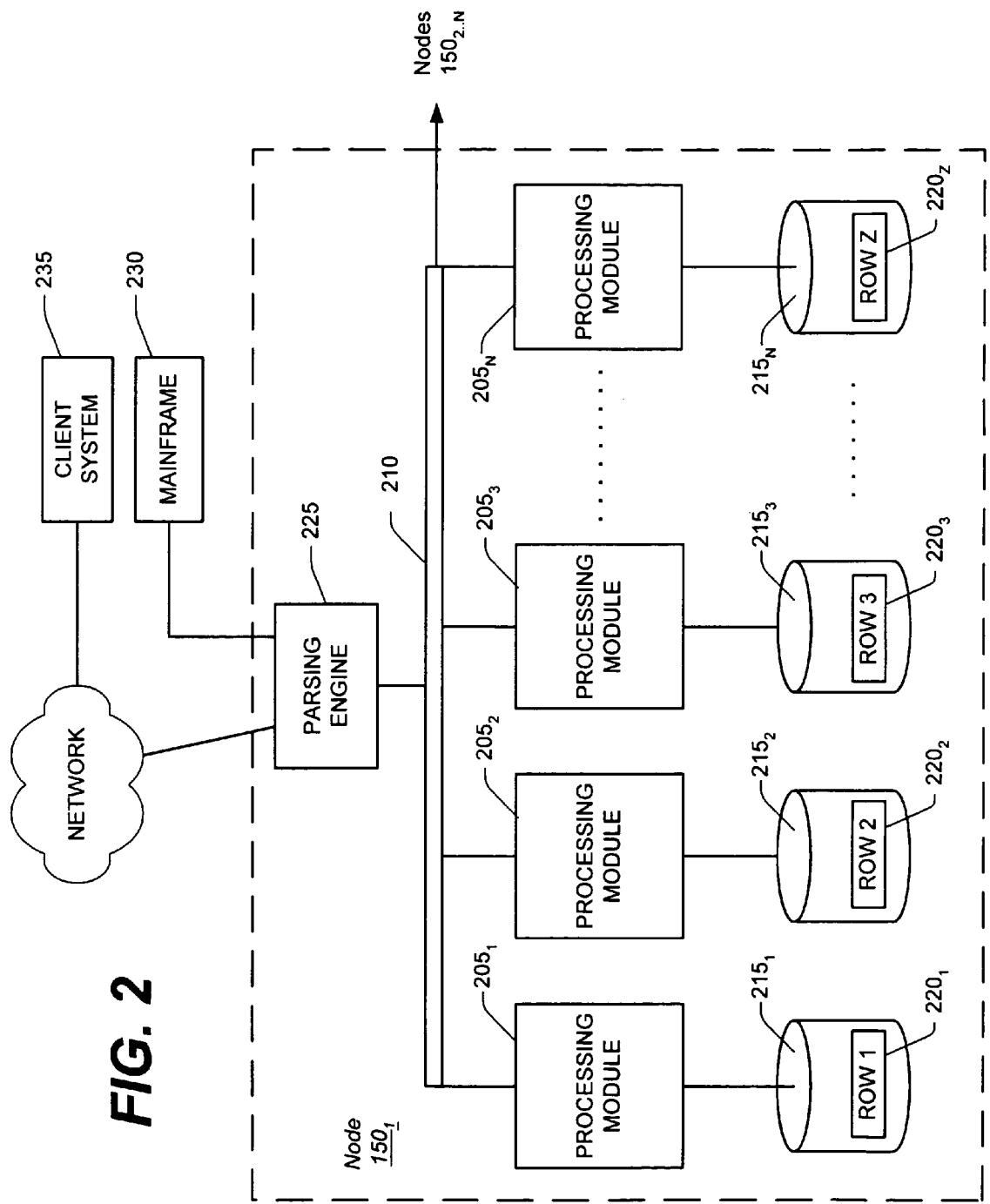

FIG. 2 shows a sample architecture for one node 150$_1$ of the DBMS 150. The DBMS node 150$_1$ includes one or more processing modules 205$_{1 \ldots N}$, connected by a network 210, that manage the storage and retrieval of data in data-storage facilities 215$_{1 \ldots N}$. Each of the processing modules 215$_{1 \ldots N}$ may be one or more physical processors or each may be a virtual processor, with one or more virtual processors running on a single physical processor. Each of the processing modules 205$_{1 \ldots N}$ manages a portion of a database that is stored in a corresponding one of the data-storage facilities 215$_{1 \ldots N}$. Each of the data-storage facilities 215$_{1 \ldots N}$ includes one or more disk drives. The DMBS may include multiple nodes 150$_{2 \ldots N}$ in addition to the illustrated node 150$_1$, connected by extending the network 210.

As described below, the system stores Web-log data in one or more tables in the data-storage facilities 215$_{1 \ldots N}$. The rows 220$_{1 \ldots Z}$ of the tables are stored across multiple data-storage facilities 215$_{1 \ldots N}$ to ensure that the system workload is distributed evenly across the processing modules 205$_{1 \ldots N}$. A parsing engine 225 organizes the storage of data and the distribution of table rows 220$_{1 \ldots Z}$ among the processing modules 205$_{1 \ldots N}$. The parsing engine 225 also coordinates the retrieval of data from the data-storage facilities 215$_{1 \ldots N}$ in response to queries received from a user at a mainframe 230 or a client computer 235. The DBMS 150 usually receives queries in a standard format, such as the Structured Query Language (SQL) put forth by the American National Standards Institute (ANSI).

Figure 3:
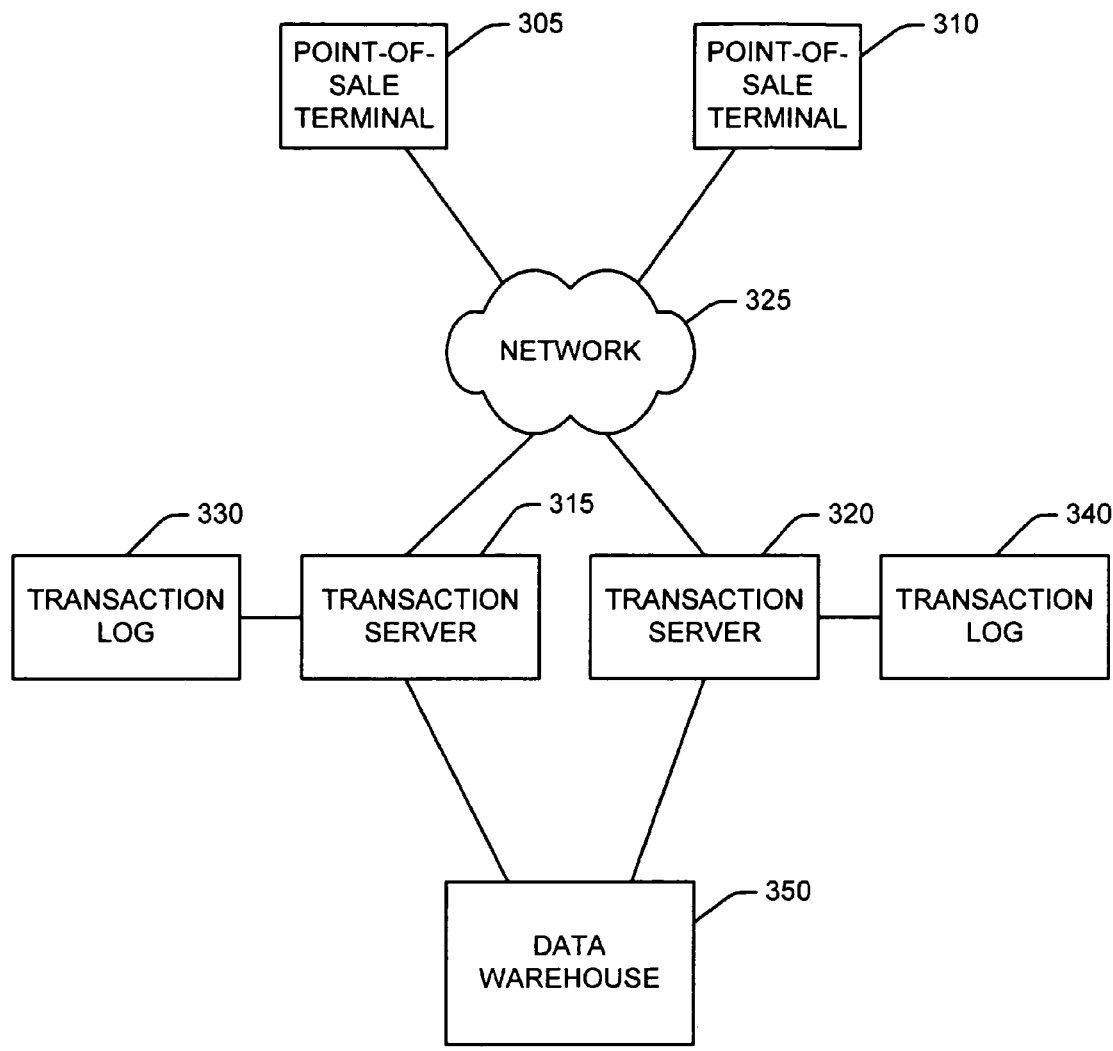
Figure 4:
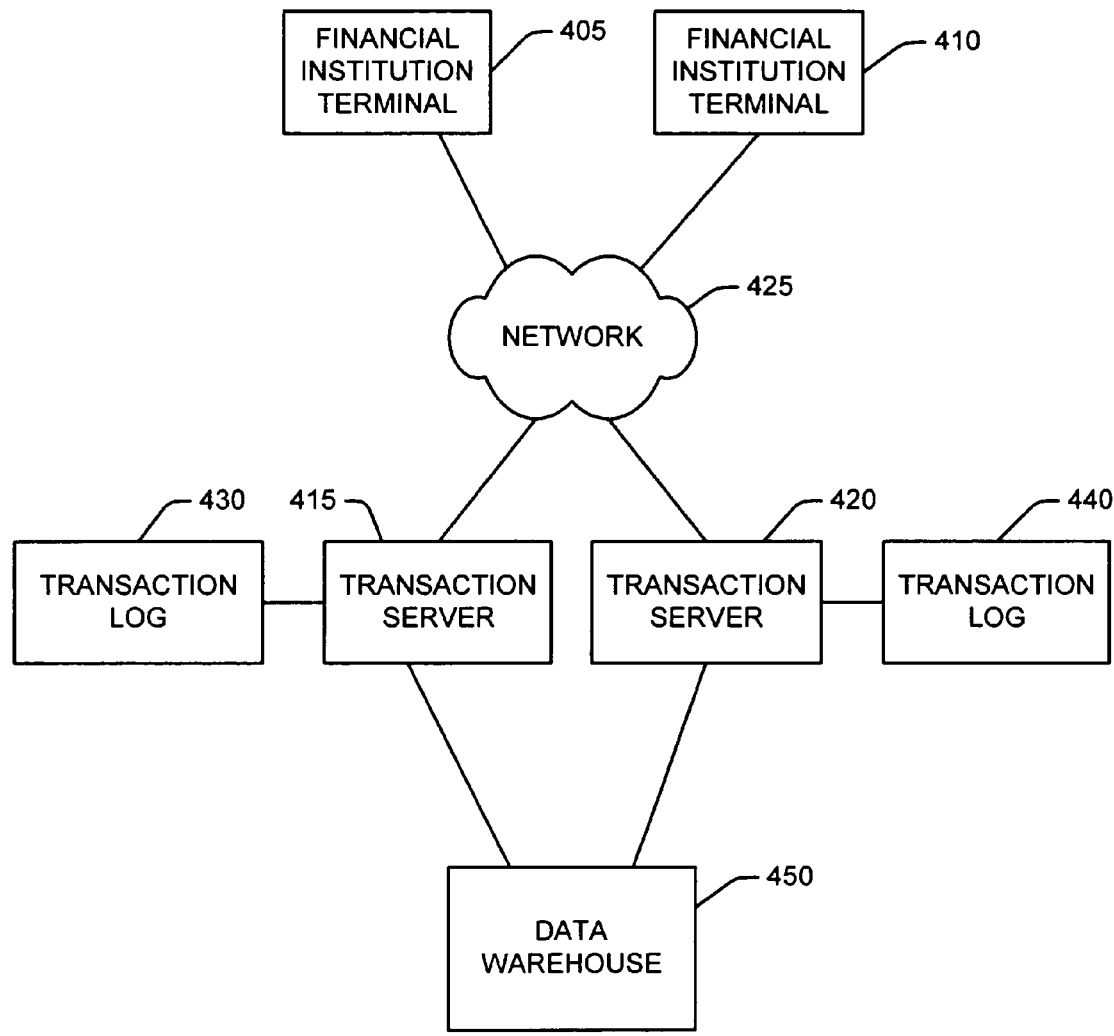

The architecture illustrated in FIGS. 1 and 2 is also applicable in retail and financial contexts, as shown in FIGS. 3 and 4. In FIG. 3, the transactions of one or more customers of a retail business are entered using point-of-sale terminals 305, 310. In a grocery store, for example, the transactions may be the records of the items rung up on the store's cash register or registers. A time stamp may be associated with each of the items indicating when the item was rung up. The point-of-sale terminals 305, 310 route every transaction to a group of transaction servers 315, 320 via a network 325, which may be a store network, an inter-store network or the Internet. The transaction servers 315, 320 store the transactions in transaction logs 330, 340 and provide the ability to transfer the information to a data warehouse 350.

In FIG. 4, the transactions of one or more customers of a financial institution, such as a bank, are entered using terminals 405, 410, which may be the terminals used by bank tellers or officers to record transactions, to open and close accounts, or to provide other information to the customer regarding the customer's accounts. A time stamp may be associated with each of the transactions indicating when it occurred. Terminals 405, 410 route every transaction to a group of transaction servers 415, 420 via a network 425, which may be a bank network, an inter-bank network or the Internet. The transaction servers 415, 420 store the transactions in transaction logs 430, 440 and provide the ability to transfer the information to a data warehouse 450.

As can be imagined from the description of FIGS. 1-4, data may not be recorded in the transaction logs (the web log will be referred to as a transaction log) in a chronological fashion. Further, transactions from different clients or terminals may be interleaved in the transaction log, further complicating the process of performing affinity analysis.

Figure 5:
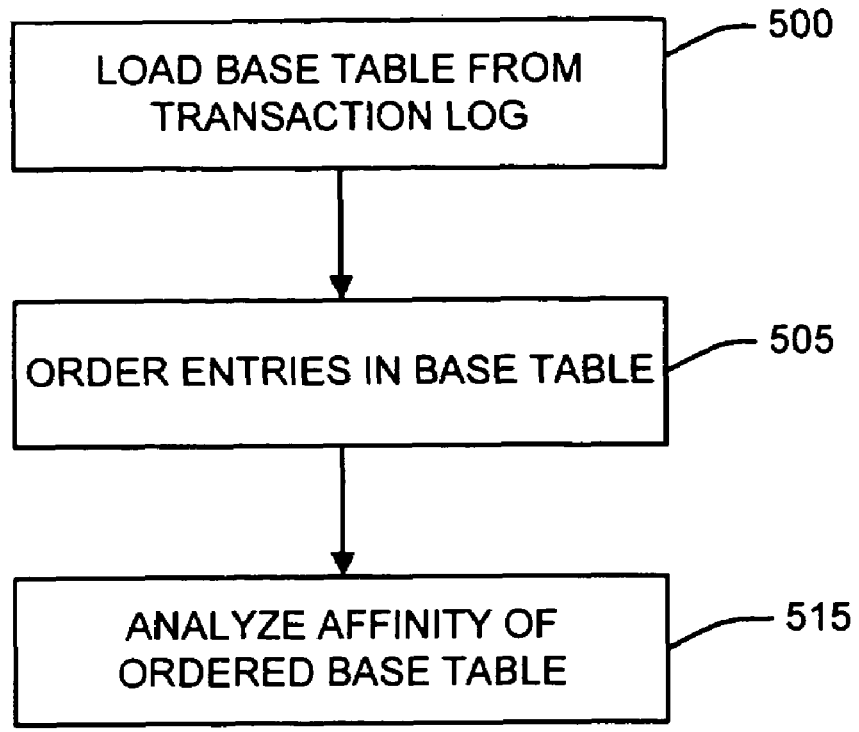
FIGS. 5, 7, 8, and 10 are flow charts of techniques for use in analyzing associations in the order of transactions.
Figure 6:
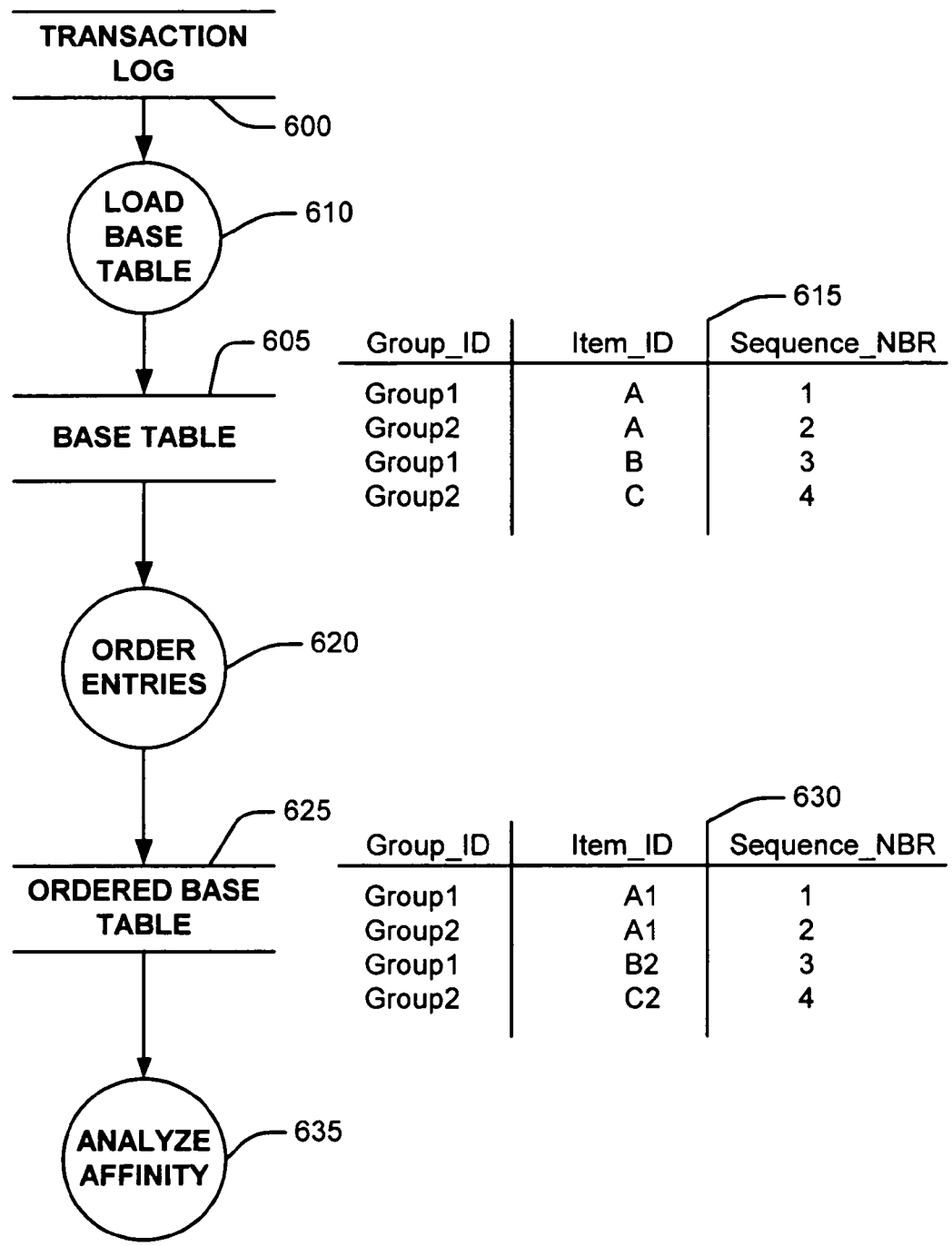
FIGS. 6, 9, 11 and 12 are data flow diagrams for techniques for use in analyzing associations in the order of transactions.

One possible process for allowing time-based affinity analysis of transactions begins by loading data from a transaction log 600 into a base table 605 in a database system (blocks 500, 610), as illustrated in the flow chart in FIG. 5 and the data flow diagram in FIG. 6. The data includes an entry for each transaction, as shown in table 610. In the example shown in FIG. 6, the base table has three columns. The first column is GROUP_ID, which is common and unique for all transactions in an "item group." The second column is ITEM_ID, which refers to an item or set of items that is the subject of the transaction. The third row is SEQUENCE_NBR, which is a sequence number reflecting the relative order of the transactions listed in the table.

As discussed in co-pending U.S. patent application Ser. No. 09/410,528, cited above, a great deal of creativity and customer value may be derived from defining what is an "item group" and an "item."

In retail, for example, a retailer may define an item group as all the items purchased by one customer at a check-out stand, and an item as anything from an individual item to a class of items such as dairy or produce.

In a financial context, for example, a banker may define an item group as all of the transactions performed by a customer in a given time period, and an item as the combined value of channel and transaction codes (such as ATM-DEPOSIT).

In a web page context, for example, a web page owner may define an item group as all transactions initiated by an individual user, and an item as each click made by the individual user or as the type of item (e.g., image, link, etc.) being clicked.

The data stored in the GROUP_ID, ITEM_ID, and SEQUENCE_NBR columns in the base table 605 may be simple translations of similar columns stored in the transaction log 600 or the load base table process (block 500, 610) may process data from the transaction log 600 to populate the base table 605. For example, loading the data from the transaction log 600 into the base table 605 may comprise parsing the data for each transaction into fields. One of the fields may be identified as a group identifier field (GROUP_ID) and another as an item identifier field (ITEM_ID).

In the example base table 615 shown in FIG. 6, the data shown stored in the GROUP_ID, ITEM_ID, and SEQUENCE_NBR column have been simplified for ease of discussion. The table shows four entries, although it should be clear that the table could include many more entries. In the first entry, the GROUP_ID is "Group1," the ITEM_ID is "A," and SEQUENCE_NBR is "1." In the second entry, the GROUP_ID is "Group2," the ITEM_ID is "A," and SEQUENCE_NBR is "2." In the third entry, the GROUP_ID is "Group1," the ITEM_ID is "B," and SEQUENCE_NBR is "3." In the fourth entry, the GROUP_ID is "Group2," the ITEM_ID is "C," and SEQUENCE_NBR is "4." Thus, in the example table shown, the entries are listed in chronological order. This is not necessary to the process as will be clear below.

After creating and loading the base table, the process creates and loads a temporary table (not shown) with a single value that represents the count of the number of unique item groups or transactions. This value is used repeatedly in the calculations that follow.

Figure 7:
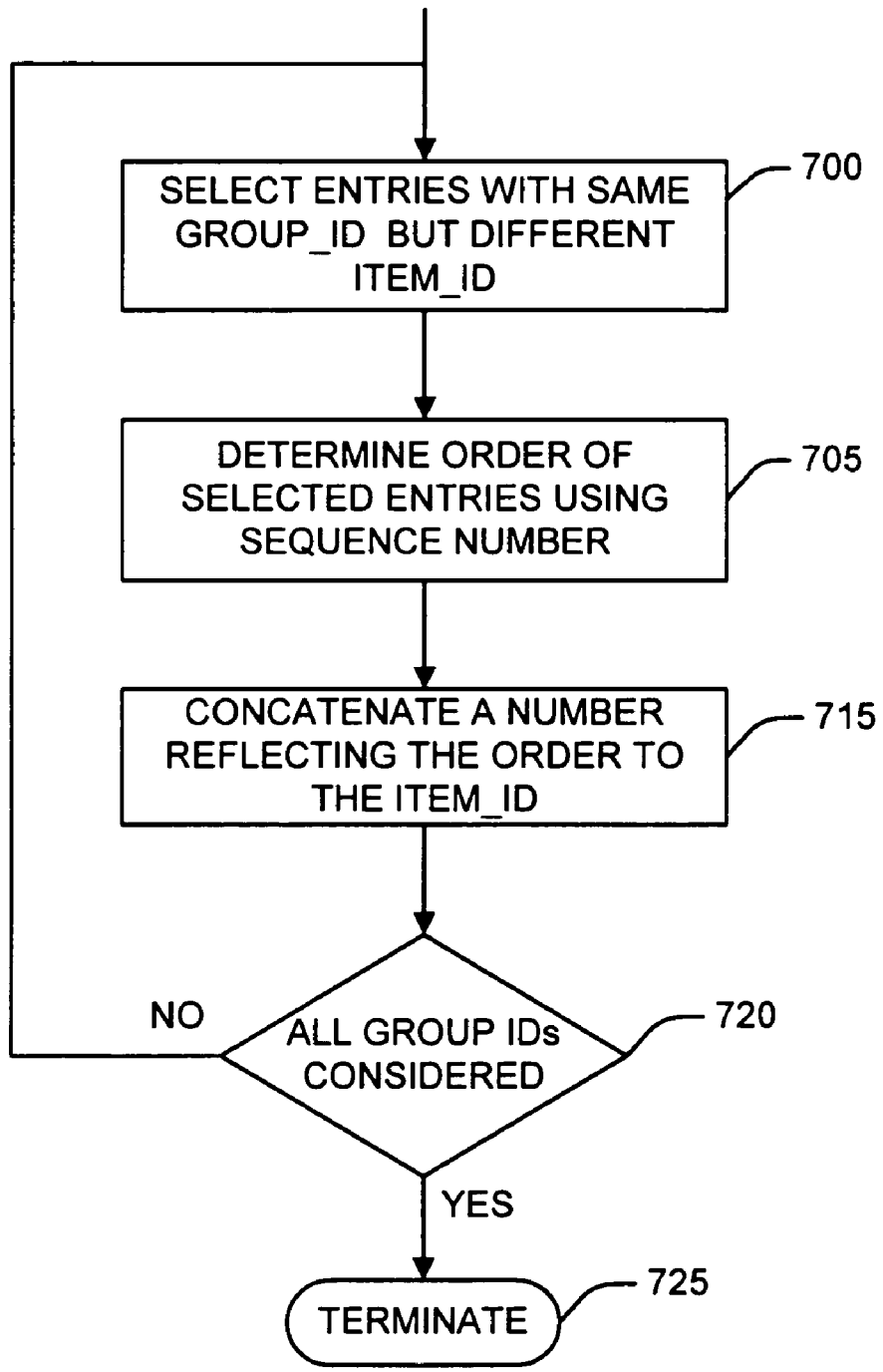

The process next orders the transactions within each group (blocks 505, 620). In one example method to order the transactions, illustrated in FIG. 7, the process selects from the base table entries having the same GROUP_ID but different ITEM_ID (block 700). For example, in example base table 615, the first and third entries satisfy these criteria because they have the same GROUP_ID (Group1) and different ITEM_IDs (A and B, respectively). Similarly, the second and fourth entries satisfy these criteria because they have the same GROUP_ID (Group2) and different ITEM_IDs (A and C, respectively).

The process then determines the order of the selected entries using the SEQUENCE_NBR field (block 705). For example, in example base table 615, the first entry, which has SEQUENCE_NBR=1, will be ordered before the third entry, which has SEQUENCE_NBR=3. Similarly, the second entry, which has SEQUENCE_NBR=2, will be ordered before the fourth entry, which has SEQUENCE_NBR=4.

In this example, the process concatenates an order number to the ITEM_ID for each entry (block 715). The result is stored in an ordered base table 625. An example ordered base table 630 illustrates the result. An order number "1" has been concatenated to the ITEM_ID for the first and second entries, resulting in ITEM_IDs="A1" in both cases, and an order number "2" has been concatenated to the ITEM_ID for third and fourth entries, resulting in ITEM_IDs of "B2" and "C2," respectively. Hereinafter, an item having an order number concatenated to its ITEM_ID will be referred to as an "ordered item."

Once all of the GROUP_IDs have been considered (block 720), the ordering is complete (block 725).

An example of SQL code to accomplish this ordering is shown below:

```
SEL CASE
  WHEN T1.SEQUENCE_NBR>T2.SEQUENCE_NBR
  THEN trim (T1. ITEM_ID)||'1'
  WHEN T2.SEQUENCE_NBR>T1.SEQUENCE_NBR
  THEN trim (T2.ITEM_ID)||'1'
  end,
CASE
  WHEN T1.SEQUENCE_NBR<T2.SEQUENCE_NBR
  THEN trim (T1.ITEM_ID)||'2'
  WHEN T2.SEQUENCE_NBR<T1.SEQUENCE_NBR
  THEN trim (T2.ITEM_ID)||'2'
  end,
((COUNT (T1.GROUP_ID) (DECIMAL (15,5)))/(SUM (DISTINCT
  T3.GROUP_NUM (DECIMAL (15,5)))))
FROM TM_SML_INPUT_TABLE T1, TM_SML_INPUT_TABLE T2,
  TM_GROUP_COUNT T3
WHERE T1.GROUP_ID=T2.GROUP_ID
  AND T1.ITEM_ID < >T2.ITEM_ID
GROUP BY 1, 2;
```

The process next performs an analysis of the groups of transactions to find associations in the order of the transactions in the groups (blocks 515, 635). As discussed above, the process for finding associations among data is described in co-pending U.S. patent application Ser. No. 09/410,528. Applying the techniques described in that application to the ordered base table 625, with the order number concatenated to the ITEM_IDs, as illustrated in table 630 shown in FIG. 6, produces affinity data relating to the order that transactions occur. It will be understood that these techniques are not limited to the specific approach described herein but may be applied to any data which can be resolved into groups and which can be ordered within the groups.

Associations are relationships between the occurances of one or more items, sometimes called the "antecedent" or "left-hand-side," in a group of transactions and the occurances of a different set of one or more items, sometimes called the "consequent" or "right-hand-side," in the same group of transactions. For example, if item A occurs in the first transaction (ITEM_ID="A1") and item B occurs in the second transaction (ITEM-ID="B2") in a large number of groups of transactions, then the association between ITEM-IDs A1 and B2 might be considered significant. In this case, an analyst trying to guide a customer to perform the action corresponding to ITEM_ID B might first guide the customer to perform the action corresponding to ITEM_ID A.

Associations can occur among two or more ordered items. For example, when considering four ordered items, the combinations of ordered items for which associations can be computed include 1→1, 2→1, 2→2, or 3→1, where the "→" symbol is read "implies" and refers to an association between the ordered item on the left side of the symbol and the ordered item or items on the right side of the symbol. The associations are determined as follows:

1→1: Determine all possible pairs of ordered items in the second base table 910, regardless of the order they appear in the table, so that the first ordered item can be considered as the left-hand side and the second ordered item can be considered as the right-hand side of all possible associations. For example, if the pair A1,B2 occurs in a group of transactions to produce an A1→B2 association, then the pair B2,A1 must also be present, producing the B2→A1 association.

2→1: Determine all three-way combinations of ordered items, but taken in such a way that the first two ordered items must always be considered together and do not include inverses. For example, if (A1,B2),C3 occurs, then (B2,A1),C3 will not occur. The results determine all 2→1 and 1→2 associations, in addition to isolating 3-item sets in determining 3→1 and 1→3 associations.

2→2: Determine all four-way combinations of ordered items, but taken in such a way that the first two ordered items must always be considered together and do not include inverses, with the same applying to the last two ordered items in a combination. For example, if (A1,B2),(C3,D4) occurs, then (B2,A1),(D4,C3) does not occur. The results determine all 2→2 associations.

3→1: Determine all four-way combinations of ordered items, but taken in such a way that the first three ordered items must always be considered together and do not include other orderings. For example, if (A1,B2,C3),D4 occurs, then (B2,A1,C3),D4 and (C3,A1,B2),D4 do not occur. The results determine all 3→1 and 1→3 associations.

This pattern continues, although business value seems to diminish after four items are considered.

One example affinity analysis process begins by building "support" tables for one, two, or more ordered items. The process calculates support by counting the item groups containing various combinations of ordered items and dividing the count by the total number of item groups. In one example, this calculation is accomplished by joining the ordered base table 625 with itself and performing the necessary aggregation, constraint, and grouping functions. A performance gain is obtained by operating directly against the ordered base table 625 rather than building intermediate tables of combinations of items and joining these intermediate tables.

Figure 8:
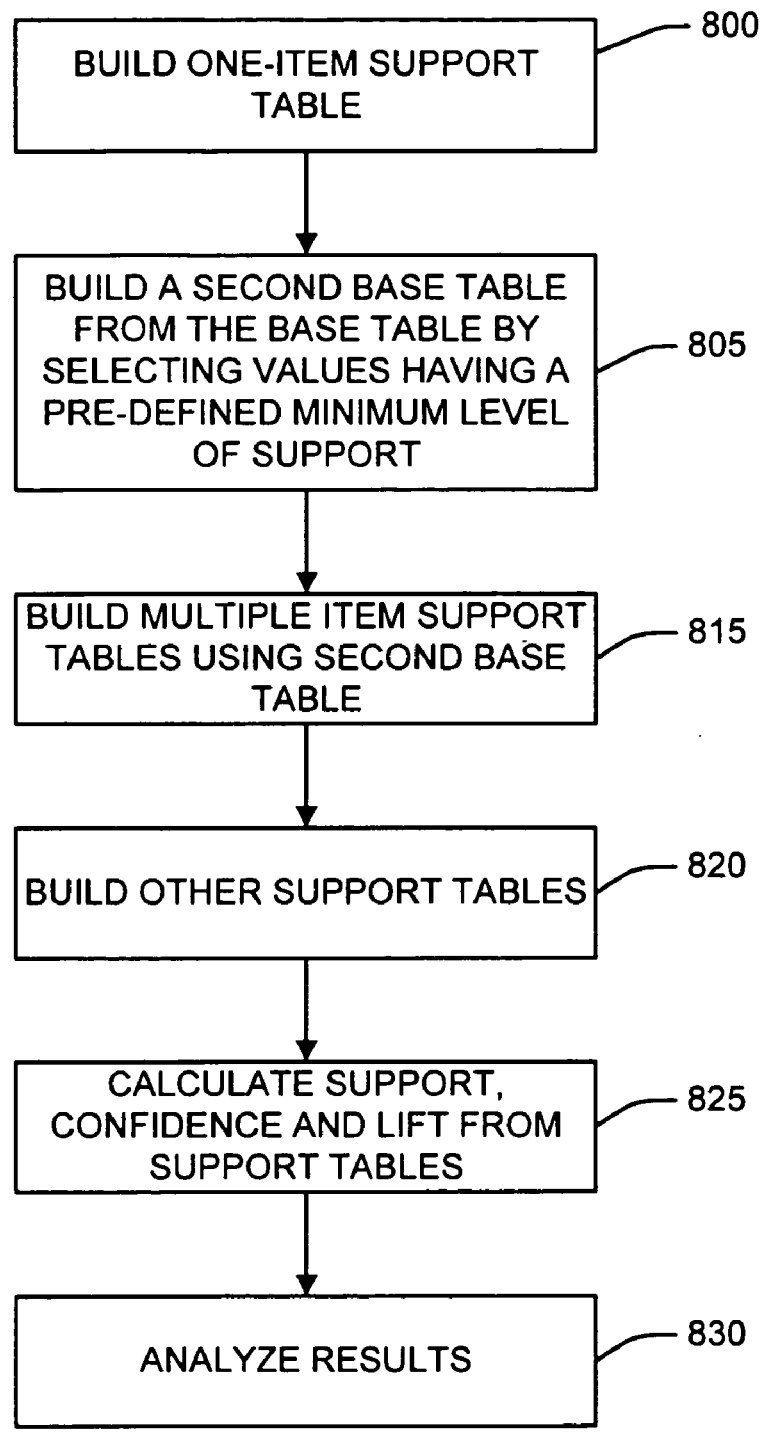
Figure 9:
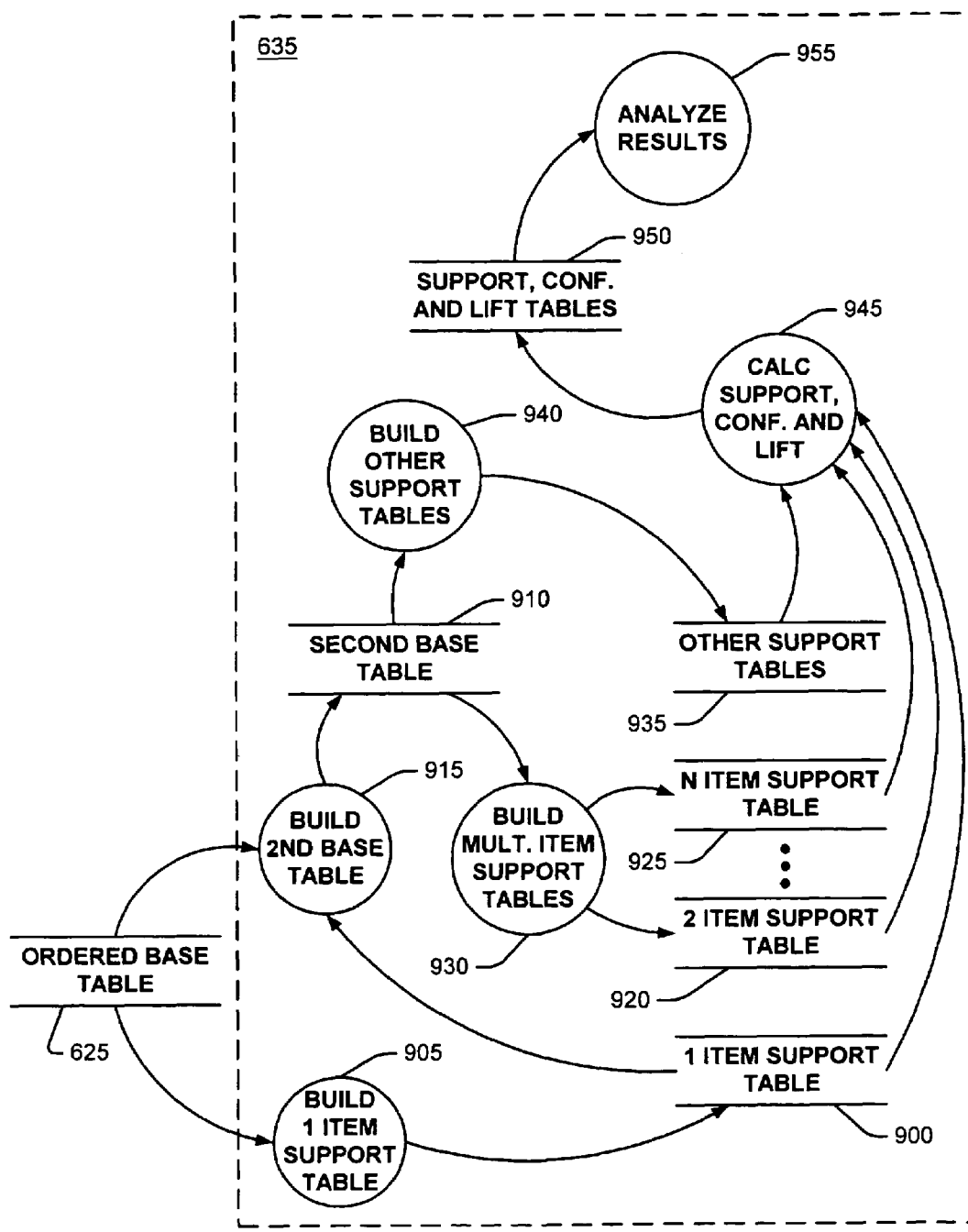
Figure 10:
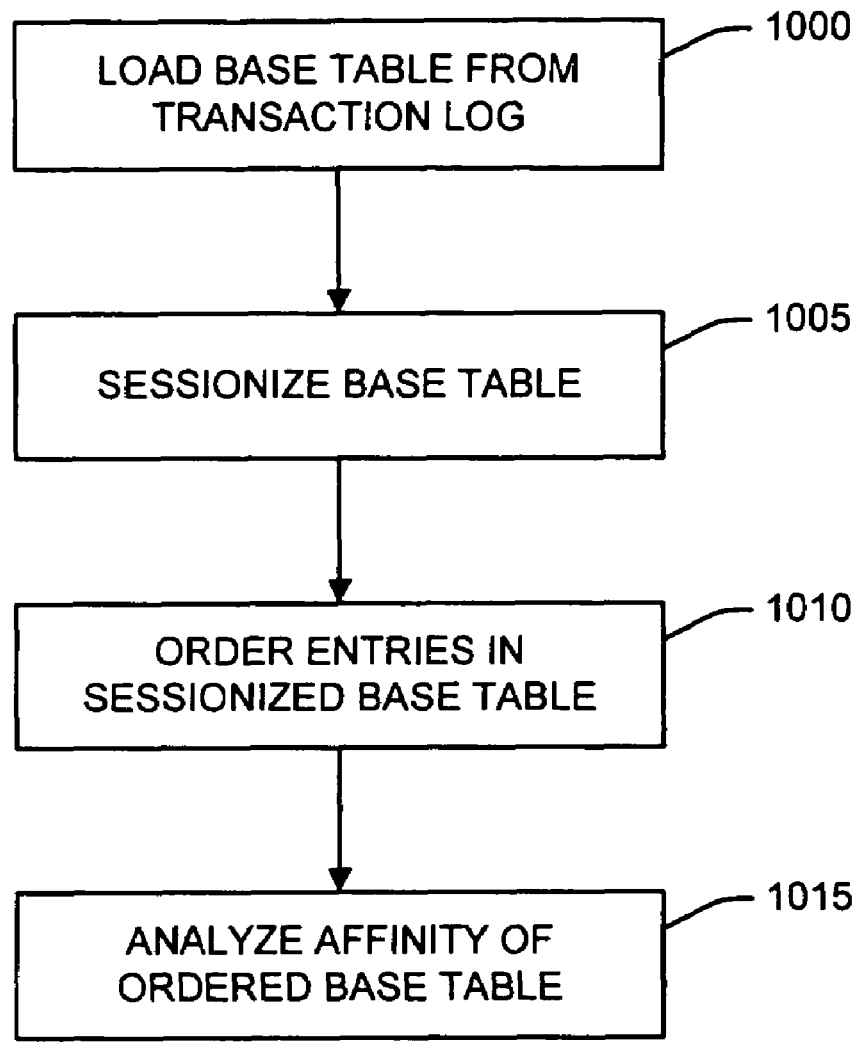

As illustrated in FIGS. 8 and 9, to perform the affinity analysis the process first builds a one-item support table 900, which contains an ITEM_ID and concatenated order number and a SUPPORT value for each ordered item in the ordered base table 625 that has a support value above a minimum specified support value of interest (for example, 0.5) (blocks 800 and 905). The process then builds a second base table 910 (also called base$_2$) from the ordered base table 625 by selecting only those ordered entries that have a certain pre-defined minimum level of support (blocks 805 and 915). Next, the process builds the support tables 920, 925 for two or more ordered items (blocks 930 and 815).

Additional associations of the form N→M, are determined as follows. First, a support table 935 is created for N+M ordered items, grouping together the first N ordered items and the next M ordered items (blocks 820 and 940). This is done by joining the second base table 910 with itself N+M times, along with the count of the number of unique item groups or transactions. WHERE clause phrases of the form "TX.ITEM_ID<TX+1.ITEM_ID" are used to group together the items. For example, if N=3 and M=2, the "T1.ITEM_ID<T2.ITEMS_ID", "T2.ITEM_ID<T3.ITEMID", and "T4.ITEM_ID<T5.ITEM_ID" are used, where T1, T2, T3, T4 and T5 are aliases for the ordered base table 625. Further, items in the first group of N ordered items are checked to be unequal to items in a second group of N ordered items. Of course, the GROUP_IDs must all be equal.

Finally, support, confidence and lift are calculated by joining the support tables described previously (blocks 825 and 945). "Support" is defined as the percentage of item groups that contain an ordered item or set of ordered items. "Confidence" is defined as the likelihood of an ordered item (A1) occurring in an item group given that a different ordered item (B2) is in the item group. More specifically, this is the support of A1,B2 divided by the support of A1. "Lift" is defined as a measure of how much the likelihood of an ordered item (B2) occurring in an item group is increased by the presence of a different ordered item (A1) in the item group. It is calculated by dividing the confidence of A1→B2 by the support of B2.

A separate table 950 is built for each combination case. For example, when considering four items, the combinations include 1→1, 1→2, 2-1, 2→2, 1→3, or 3→1. The general form of these joins is to join: (1) the support table matching the left-hand side of the association, (2) the support table matching the entire association, and (3) the support table matching the right-hand side of the association.

For associations of the form N→M, support, confidence and lift are determined by joining N_support, N→M_support, and M_support tables together. This means that the method must also generate support tables for N items and for M items in addition to the support tables for N+M items described above. Note that a (N–1)→1 table can be used for N_support and a M→N table for M→N support.

Finally, the process provides the ability for a user to analyze the results stored in the support, confidence and lift tables 950 (blocks 830 and 955).

A similar process can be followed to perform an affinity analysis of the order of transactions in a sessionized data base. As before, the method includes loading data from the transactions, for example from transaction log 1100, into a base table 1105 in a database system (blocks 1000 and 1110). The data includes an entry for each transaction and each entry includes a time stamp. For ease of discussion, the time stamp has been simplified as compared to the date-time stamp illustrated in Table 1. Loading the data includes grouping the transactions into groups, as described above with respect to FIG. 6, and as illustrated by table 1115. In the example shown in table 1115, the transactions shown are all grouped into Group 1. The first two transactions occurred around 13:15 and the second two transactions occurred around 21:11.

The process selects sessions of transactions belonging to the same group and corresponding to a single session (blocks 1005 and 1120) to produce a sessionized base table 1125. In one example sessionizing algorithm, selecting sessions of transactions includes selecting entries with time stamps lying in a predetermined range. For example such a sessionizing algorithm will select the first two transactions shown in the example base table 1115 to be part of one session occurring at around 13:15 and the second two transactions to be part of another session occurring at around 21:11. This is illustrated in example sessionized base table 1130, which shows that the first two entries are included in session 1 and the second two entries are included in session 2. Note that the time stamp column has been left off the example ordered base table 1130 to conserve space on the drawing.

Figure 11:
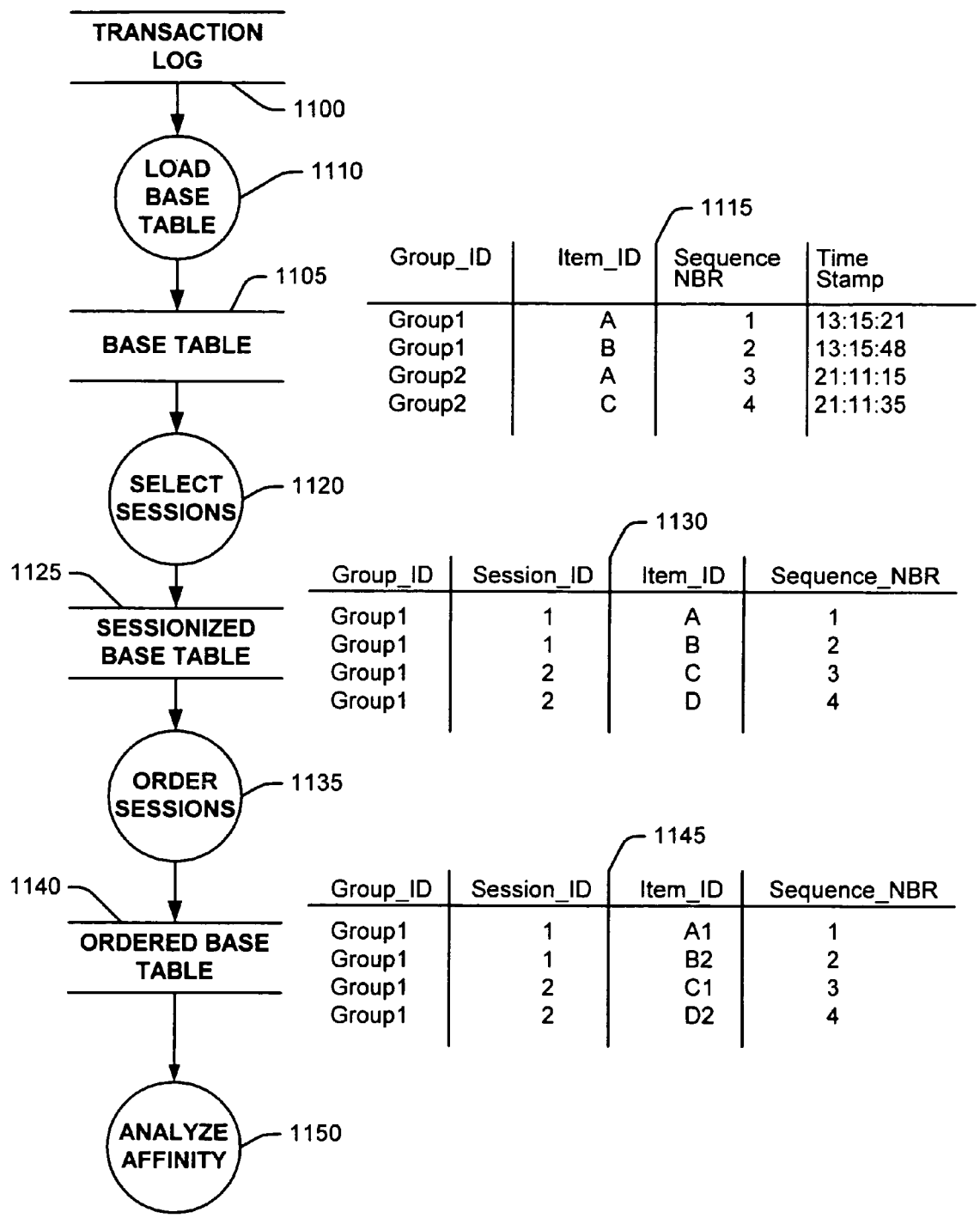

The process next orders the transactions within each session (blocks 1010 and 1135) to produce an ordered sessionized base table 1140. In this case, when the transactions have been sessionized, the order numbers concatenated to the ITEM_ID relate to the session to which the transaction belongs, as illustrated in the example ordered sessionized base table 1145 illustrated in FIG. 11. The first transaction in the first session has been assigned order number "1" and the second transaction in the first session has been assigned order number "2." The two transactions in the second session have been treated similarly.

The scheme used to order the transactions can take a number of forms. For example, ordering may include numbering the selected entries based on their respective time stamps, as shown in table 1145. The selected entries may be numbered from the earliest entry to the latest entry. Alternatively, the entries may be numbered from the latest to the earliest or based on their respective distance in time from a reference time.

Figure 12:
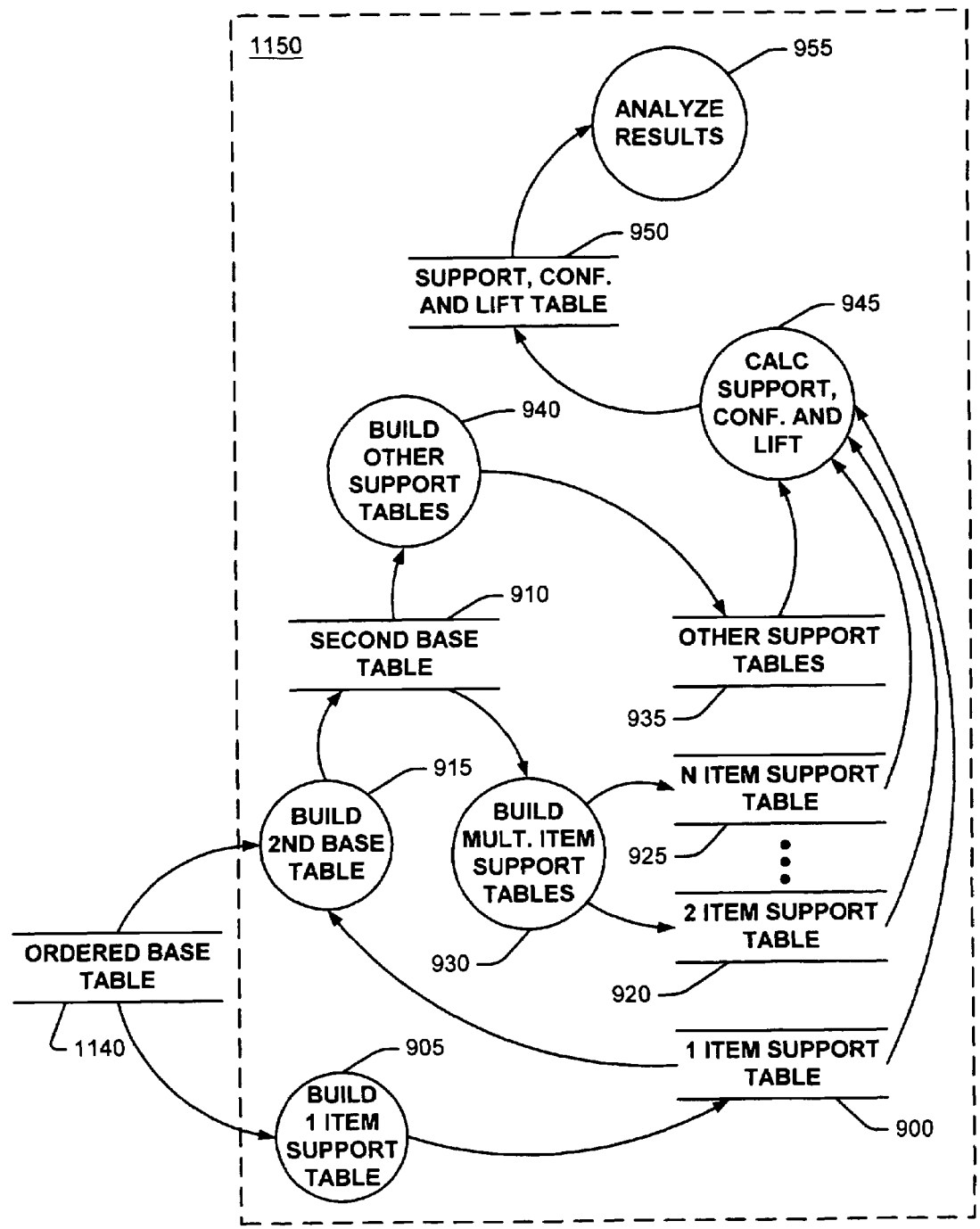

Finally, the process performs an analysis of the sessions of transactions to find associations in the order of the transactions in the sessions (blocks 1015 and 1150), as illustrated in FIG. 12. The analysis shown in FIG. 12 is virtually identical to that illustrated in FIG. 9, with the exception that the analysis in FIG. 12 begins with the ordered sessionized base table 1140, rather than the ordered base table 625 shown in FIG. 9.

The various implementations of the invention are realized in electronic hardware, computer software, or combinations of these technologies. Most implementations include one or more computer programs executed by a programmable computer. In general, the computer includes one or more processors, one or more data-storage components (e.g. volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copies into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other embodiments are also within the scope of the following claims.

What is claimed is:

1. A method for use in analyzing associations in the sequence of transactions, the method comprising:
    loading data from the transactions into a database system, where the data includes an entry for each transaction and the transactions are grouped into sessions, by:
        parsing the transaction data into fields in a base table in the database system;

identifying one of the fields as a session identifier field where a session identifier for each transaction is stored;

identifying one of the fields as an item identifier field where an item identifier for each transaction is stored;

ordering the transactions in sequence within each session by:

concatenating a sequence number to the item identifier for each transaction to create a concatenated sequence number; and performing an analysis of the sessions of transactions to find associations in the sequence of the transactions in the sessions by:

building one or more support tables for one or more item identifiers with the concatenated sequence number; and calculating support, confidence and lift by joining the support tables.

2. The method of claim 1 wherein the data for each transaction includes a time stamp related to a time that the transaction occurred and wherein ordering the transactions comprises:

creating the sequence number for each transaction based on the time stamps included in the data for the transactions.

3. The method of claim 2 wherein creating the sequence number for each transaction comprises:

numbering the transactions in sequence from the transaction having the earliest time stamp to the transaction having the latest time stamp.

4. The method of claim 1 wherein performing the analysis comprises performing an affinity analysis.

5. The method of claim 1 wherein building the one or more support tables comprises counting the transactions containing various combinations of item identifiers with concatenated sequence number and dividing the count by a total number of sessions to obtain a support for each of the combinations.

6. The method of claim 1 wherein building the one or more support tables comprises for each item identifier with concatenated sequence number, counting the transactions containing the same item identifier with concatenated sequence number and computing the support by dividing the count by a total number of sessions and storing the item identifier with concatenated sequence number and the support in a first support table.

7. The method of claim 6 wherein building the one or more support tables further comprises building a second base table by selecting transactions from the first base table that include an item identifier corresponding to an item identifier and concatenated sequence number having a support more than a predetermined value.

8. The method of claim 7 wherein building the one or more support tables further comprises counting the transactions in the second base table containing various combinations of item identifiers with concatenated sequence number and dividing the count by a total number of sessions in the second base table to obtain a support for each of the combinations.

9. The method of claim 7 wherein building the one or more support tables further comprises counting the transactions in the second base table containing combinations of two specified item identifiers with concatenated sequence number and dividing the count by a total number of transactions in the second base table to obtain a support for each of the combinations; and storing the item identifiers and computed support in a two item support table.

10. The method of claim 7 wherein building the one or more support tables further comprises counting the transactions in the second base table containing combinations of N specified item identifiers with concatenated sequence number and dividing the count by a total number of transactions in the second base table to obtain a support for each of the combinations; and storing the item identifiers and computed support in an N item support table.

11. A computer program, stored on a tangible storage medium, for use in analyzing associations in the sequence of electronically stored transactions, the program comprising executable instructions that cause a computer to:

load data from the transactions into a database system, where the data includes an entry for each transaction and the transactions are grouped into sessions, by:

parsing the transaction data into fields in a base table in the database system;

identifying one of the fields as a session identifier field where a session identifier for each transaction is stored;

identifying one of the fields as an item identifier field where an item identifier for each transaction is stored;

order the transactions in sequence within each session by:

concatenating a sequence number to the item identifier for each transaction; and perform an analysis of the sessions of transactions to find associations in the sequence of the transactions in the sessions by:

building one or more support tables for one or more item identifiers with concatenated sequence number; and calculating support, confidence and lift by joining the support tables.

12. A database system for use in analyzing associations in the order of transactions, the database system comprising a massively parallel processing system comprising one or more nodes;

a plurality of CPUs, each of the one or more nodes providing access to one or more CPUs;

a plurality of virtual processes each of the one or more CPUs providing access to one or more virtual processes;

each virtual process configured to manage data stored in one of a plurality of data-storage facilities;

a parsing engine configured to parse transaction data and store the parsed transaction data in a table that is distributed across two or more data-storage facilities, where the data includes an entry for each transaction and the transactions are grouped into sessions, by parsing the transaction data into fields in a base table in the database system;

identifying one of the fields as a session identifier field where a session identifier for each transaction is stored;

identifying one of the fields as an item identifier field where an item identifier for each transaction is stored;

a database-management component configured to operate on the table to order the transactions in sequence within each session by concatenating a sequence number to the item identifier for each transaction; and perform an analysis of the sessions of transactions to find associations in the sequence of the transactions in the sessions by:

building one or more support tables for one or more item identifiers with concatenated sequence number; and calculating support, confidence and lift by joining the support tables.

* * * * *